US012459357B2

United States Patent
Ito

(10) Patent No.: US 12,459,357 B2
(45) Date of Patent: Nov. 4, 2025

(54) VEHICLE DISPLAY DEVICE

(71) Applicant: NIPPON SEIKI CO., LTD., Niigata (JP)

(72) Inventor: Atsushi Ito, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 218 days.

(21) Appl. No.: 18/457,751

(22) Filed: Aug. 29, 2023

(65) Prior Publication Data

US 2024/0100949 A1     Mar. 28, 2024

(30) Foreign Application Priority Data

Sep. 26, 2022   (JP) ................. 2022-152259

(51) Int. Cl.
*B60K 35/22*     (2024.01)
*B60K 35/81*     (2024.01)
*B60K 35/28*     (2024.01)

(52) U.S. Cl.
CPC .............. *B60K 35/22* (2024.01); *B60K 35/81* (2024.01); *B60K 35/28* (2024.01); *B60K 2360/16* (2024.01)

(58) Field of Classification Search
CPC ........ B60K 35/00; B60K 35/28; B60K 35/81; B60K 2360/16; B60K 35/22
See application file for complete search history.

(56) References Cited

U.S. PATENT DOCUMENTS

| | | | | |
|---|---|---|---|---|
| 9,715,752 | B2* | 7/2017 | Hosoda | G06T 11/60 |
| 12,025,798 | B1* | 7/2024 | Dehkordi | G02B 27/0101 |
| 2012/0036418 | A1* | 2/2012 | Morino | G06F 11/1004 |
| | | | | 714/E11.032 |
| 2018/0170259 | A1* | 6/2018 | Maejima | H04N 23/63 |
| 2018/0301095 | A1* | 10/2018 | Runyan | G09G 3/3406 |
| 2021/0117375 | A1* | 4/2021 | Wallach | G06F 9/3016 |
| 2021/0334645 | A1* | 10/2021 | Pardeshi | G10L 25/51 |
| 2022/0114989 | A1* | 4/2022 | Ito | B60K 35/81 |

FOREIGN PATENT DOCUMENTS

JP        2012-30703 A      2/2012

* cited by examiner

*Primary Examiner* — Richard M Camby
(74) *Attorney, Agent, or Firm* — Rimon P.C.

(57) ABSTRACT

To provide a vehicle display device with high reliability from the viewpoint of functional stability. A vehicle display device of the present disclosure includes a display displaying an image and a multicore causing the display to display an image representing vehicle information. The includes a first processor core performing normal display control under which the display is caused to display the vehicle information in normal times, and a second processor core performing alternative display control under which the display is caused to display the vehicle information in a false display state where the vehicle information is not correctly displayed on the display under the normal display control.

10 Claims, 3 Drawing Sheets

VEHICLE DISPLAY DEVICE

CROSS REFERENCE TO RELATED APPLICATIONS

The present application claims priority from Japanese Patent Application No. 2022-152259 filed on Sep. 26, 2022, and the entire contents of which are hereby incorporated by reference.

TECHNICAL FIELD

The present disclosure relates to a vehicle display device displaying vehicle information in an image.

BACKGROUND ART

Patent Document 1 discloses a vehicle display device displaying an information image including vehicle information. This vehicle display device combines, with a drawing processing means such as a graphic controller, a plurality of layers including the information image and displays same on an image display device.

PRIOR ART DOCUMENT

Patent Document

Patent Document 1: Japanese Unexamined Patent Application Publication No. 2012-30703

SUMMARY OF INVENTION

Technical Problem

In the vehicle display device described above, when the drawing processing means malfunctions, the information image cannot be displayed.

In view of the above-described problem, a purpose of the present disclosure is to provide a vehicle display device with high reliability from the viewpoint of functional stability.

Solution to Problem

A vehicle display device of the present disclosure is a vehicle display device including a display displaying an image, and a multicore SOC causing the display to display an image representing vehicle information.

The SOC includes therein a first processor core performing normal display control under which the display is caused to display the vehicle information in normal times, and a second processor core performing alternative display control under which the display is caused to display the vehicle information in a false display state where the vehicle information is not displayed on the display under the normal display control.

Advantageous Effects of Invention

According to the present disclosure, a vehicle display device with high reliability from the viewpoint of functional stability can be provided.

DESCRIPTION OF EMBODIMENTS

First Embodiment

Figure 1:
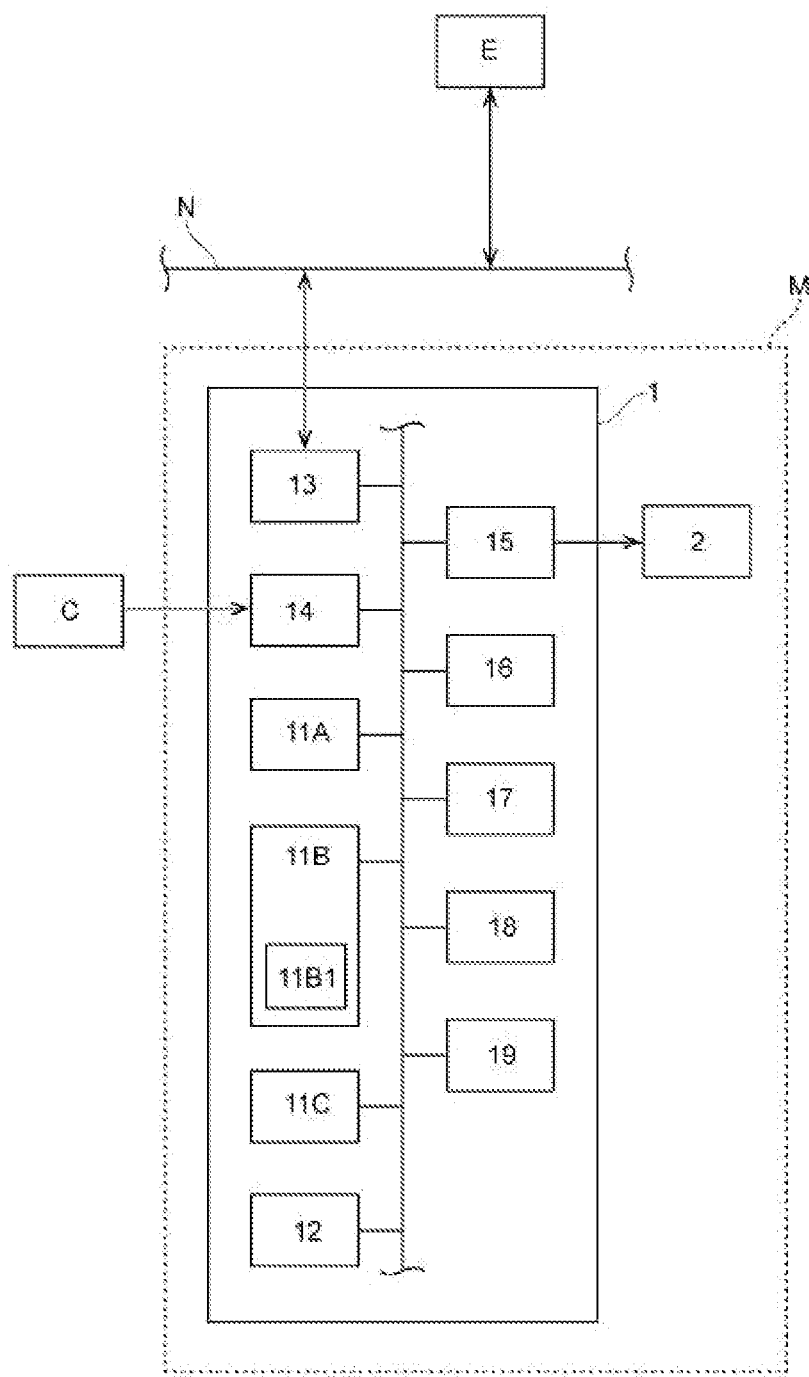
FIG. 1 is a configuration diagram of a vehicle display device.

A vehicle display device M is an instrument displaying vehicle information to a passenger on a vehicle. The vehicle display device M is mounted on an instrument panel of the vehicle.

The vehicle information is information pertaining to vehicle driving such as a vehicle traveling speed, an engine speed, a vehicle automatic control state, a warning lamp, a residual fuel amount (residual energy amount), tire air pressure, route guidance information, and a video of a vehicle-mounted camera.

The vehicle automatic control state is an operation state of an automatic driving mode in which acceleration and deceleration and steering of the vehicle are automatically controlled by the vehicle. Examples of the automatic driving mode are an auto-pilot mode in which the vehicle travels at constant speed with the inter-vehicular distance from a vehicle ahead kept constant, an auto-lane change mode in which the vehicle controls steering to change the lane when a driver operates a direction indicator, an auto-park mode in which the vehicle is moved to and parked at a space determined by the vehicle as available parking space, and the like.

Examples of the operation state of the auto-pilot mode are target traveling speed, a detection state of a vehicle ahead, an inter-vehicular distance from a vehicle ahead, a driving ready state of a driver, an auto-pilot mode cancellation forenotice alarm, and the like. The driving ready state of a driver is a state obtained by determining whether the driver places the hands of the driver on the steering and can immediately drive manually or not.

Examples of the operation state of the auto-lane change mode are a detection state of an obstacle (presence or absence of a vehicle behind) on a change destination lane, guidance for a traveling route of the vehicle during changing the lane, a driving ready state of a driver, an auto-lane change cancellation forenotice alarm, and the like.

Examples of the operation state of the auto-park mode are a candidate of a parkable place on a map (or on an image captured by an external camera), a place at which the vehicle is to be parked, an image around the vehicle captured by an external camera, a driving ready state of a driver, an auto-park mode cancellation forenotice alarm, and the like.

The vehicle display device M includes a system on a chip (SOC) 1 and a display 2.

The SOC 1 is an integrated semiconductor chip in which all functions required to operate the vehicle display device M are mounted on one integrated circuit chip. The functions required to operate the vehicle display device M correspond to a function (instrument display function) to cause the display 2 to display the vehicle information. The SOC 1 acquires a video signal pertaining to surroundings of the vehicle captured by a vehicle-mounted camera C that captures an image of the surroundings of the vehicle and causes the display 2 to display same, if needed. In addition, the SOC 1 causes the display 2 to display the vehicle information acquired from a vehicle-mounted control unit E via an in-vehicle network N.

The display 2 is a device displaying an image, such as a liquid crystal display or an organic EL display. The display 2 inputs the video signal output from the SOC 1 and displays, on a screen, an image based on the video signal.

Configuration of SOC

The SOC 1 includes therein a first processor core 11A, a second processor core 11B, a third processor core 11C, a PVT monitor part 12, a communication part 13, a video input part 14, a display control part 15, a ROM 16, a RAM 17, a 2D drawing part 18, and a 3D drawing part 19.

The first processor core 11A is an operation device independently functioning separately from other cores.

The first processor core 11A loads, on the RAM 17, an operating system (OS) stored in the ROM 16 and a program operates on the OS, and starts operation. Since the first processor core 11A loads the OS, the startup time thereof is longest among the processor cores 11A to 11C.

The first processor core 11A draws an image representing the vehicle information in an area corresponding to a screen layer L1 in the RAM 17 in a normal display mode described later.

The second processor core 11B is an operation device independently functioning separately from other cores. The second processor core 11B includes therein an internal memory 11B1. The internal memory 11B1 includes an in-core ROM and an in-core RAM.

The second processor core 11B loads a program stored in the in-core ROM on the in-core RAM and starts operation. The startup time of the second processor core 11B is shortest among the processor cores 11A to 11C.

The second processor core 11B is a secured processor core decrypting an encrypted instruction code and executing same. The second processor core 11B includes a core-specific key storage storing a specific key (core-specific key). The in-core ROM of the internal memory 11B1 stores an encrypted program in a non-rewritable form. The second processor core 11B authenticates the encrypted instruction code for the program stored in the in-core ROM using the core-specific key to decrypt the program and execute the program.

The second processor core 11B draws an image representing the vehicle information in an area corresponding to a screen layer L2 in the RAM 17 in an emergency display mode described later.

The third processor core 11C is an operation device independently functioning separately from other cores.

The third processor core 11C loads a program stored in the ROM 16 on the RAM 17 and starts operation.

The third processor core 11C draws an image representing the vehicle information in an area corresponding to a screen layer L3 in the RAM 17 in a startup performance display mode described later.

A process, voltage and temperature (PVT) monitor part 12 is a functional block that monitors whether operation of each of the processor cores 11A to 11C is normal or not. The PVT monitor part 12 monitors whether the power supply voltage supplied to each of the processor cores 11A to 11C and the operation clock are normal. In addition, the PVT monitor part 12 monitors whether the temperature of each of the processor cores 11A to 11C is within a guaranteed operating range or not.

The communication part 13 is a functional block that communicates according to a predetermined communication protocol. The predetermined communication protocol is, for example, controller area network (CAN) media oriented systems transport (MOST), ethernet, or the like. The communication part 13 communicates with the vehicle-mounted control unit E via the in-vehicle network N, acquires the vehicle information, and stores same in the RAM 17.

The video input part 14 is a functional block that inputs a video signal of a predetermined standard. The video signal of a predetermined standard is the national television system committee (NTSC), low voltage differential signaling (LVDS), high-definition multimedia interface (HDMI (registered trademark)), or the like. The video input part 14 inputs a video signal pertaining to surroundings of the vehicle captured by the vehicle-mounted camera C and stores same in the RAM 17.

The display control part 15 is a functional block that outputs the video signal of a predetermined standard to the display 2 and causes the display 2 to display an image representing the vehicle information. The video signal of a predetermined standard is LVDS, HDMI (registered trademark), or the like.

Figure 2:
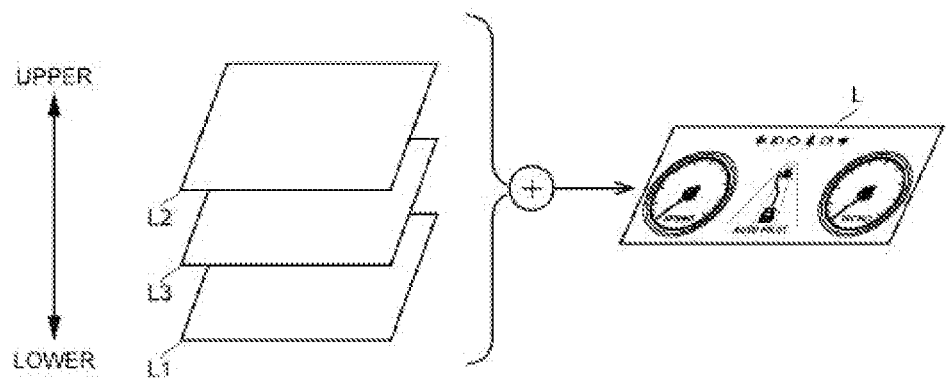
FIG. 2 is a configuration diagram of layers.
Figure 3:
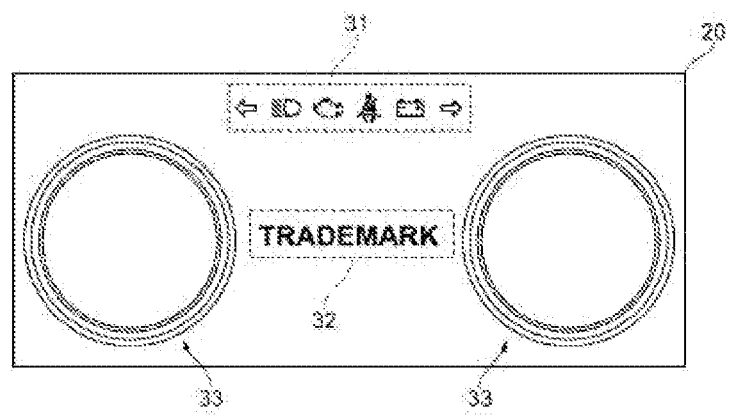
FIG. 3 is a display example of the vehicle display device at startup.

Description will be made with reference to FIG. 2. The display control part 15 overlays and combines screen layers L1 to L3 as a composite layer L through operations of the respective processor cores 11A to 11C. The screen layers L1 to L3 are in the order of L1, L3, and L2 from the bottom. The display control part 15 overlays the screen layer L3 on the screen layer L1 and further overlays the screen layer L2 on the screen layer L3 to compose the composite layer L as one screen.

The display control part 15 outputs a video signal representing the composite layer L to the display 2.

The ROM 16 is a NAND flash memory or an NOR flash memory, for example.

The RAM 17 is a DDRSDRAM transferring data in a double data rate (DDR) system. The RAM 17 is a working memory temporarily storing data obtained through operations of the respective processor cores 11A to 11C.

The 2D drawing part 18 is a functional block that draws a two-dimensional vector graphic or raster graphic image.

The 3D drawing part 19 is a functional block that draws a three-dimensional computer graphic image.

SOC 1 Startup Sequence

Startup of each of the processor cores 11A to 11C of the SOC 1 will be described. When power is applied to the SOC 1, the second processor core 11B is firstly starts up. When the second processor core 11B completes own startup, the second processor core 11B runs the third processor core 11C. When the third processor core 11C completes own startup, the third processor core 11C runs the first processor core 11A. The SOC 1 executes the startup performance display mode until startup of the first processor core 11A is completed in a state where startup of the third processor core 11C has been completed.

Startup Performance Display Mode: Startup Display control

The startup performance display mode will be described.

The first processor core 11A draws nothing on the screen layer L1. The second processor core 11B also draws nothing on the screen layer L2. Drawing nothing refers to a state where the whole screen has the maximum transmittance and is completely colorless and transparent.

The third processor core 11C controls the 2D drawing part 18 and draws an image representing the vehicle information on the screen layer L3. The vehicle information drawn on the screen layer L3 includes a warning lamp 31, a trademark 32 of the vehicle on which the vehicle display device M is mounted (or of a vehicle manufacturer), and a decoration 33 decorating the startup performance. The warning lamp 31 is an image representing a symbol mark corresponding to warning such as voltage anomaly of an in-vehicle battery. The trademark 32 and the decoration 33 are opening performance images providing performance for startup of the vehicle display device M. The opening performance image may be an animation provided by switching multiple decorations 33 so that, for example, a ring-shaped decoration 33 appears to rotate.

The second processor core 11B draws nothing on the screen layer L2.

Figure 4:
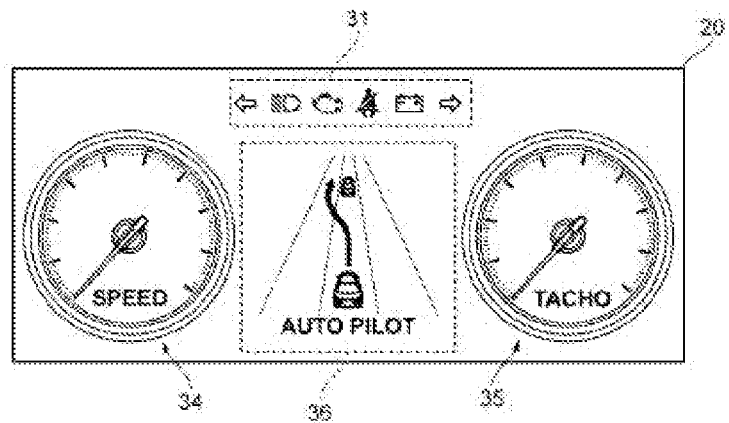
FIG. 4 is a display example of the vehicle display device in normal times.

The display control part 15 combines the screen layers L1 to L3 to compose the composite layer L and displays the image illustrated in FIG. 4 on the display screen 20 of the display 2. In this setup performance display mode, the warning lamp 31 can be displayed, and performance for startup of the vehicle display device M is displayed as the opening performance image.

After display of this opening performance image is completed, and startup of the first processor core 11A is completed, the SOC 1 shifts to the normal display mode.

Normal Display Mode: Normal Display Control

The normal display mode will be described.

The first processor core 11A controls the 3D drawing part 19 and draws an image representing the vehicle information on the screen layer L1. The vehicle information drawn on the screen layer L1 includes the warning lamp 31, a traveling speed 34, an engine speed 35, and a vehicle automatic control state 36. The traveling speed 34 drawn by the 3D drawing part 19 is a form of a pointer-type instrument having an index scale and an indicator. The engine speed 35 drawn by the 3D drawing part 19 is a form of a three-dimensional pointer-type instrument similar to the traveling speed 34. The vehicle automatic control state 36 drawn by the 3D drawing part 19 is a three-dimensional form in which a symbol representing the control state is arranged on the own vehicle and surrounding roads.

The third processor core 11C draws nothing on the screen layer L3.

The first processor core 11B draws nothing on the screen layer L2.

Figure 5:
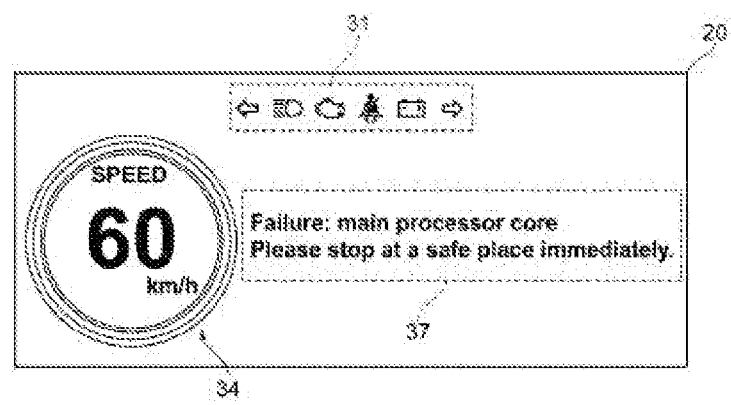
FIG. 5 is a display example of the vehicle display device in a false display state.

The display control part 15 combines the screen layers L1 to L3 to compose the composite layer L and displays the image illustrated in FIG. 5 on the display screen 20 of the display 2. In this normal display mode, various pieces of the vehicle information are displayed to a driver.

The second processor core 11B monitors the first processor core 11A through the PVT monitor part 12 during this normal display mode. The state where operation of the first processor core 11A is determined as abnormal in the normal display mode is a false display state in which correct vehicle information is not displayed on the display 2 under the normal display control. When the first processor core 11A is in the false display state, the SOC 1 shifts to the emergency display mode.

Emergency Display Mode: Alternative Display Control

The emergency display mode will be described. The SOC 1 shifts to the emergency display mode, when operation of the first processor core is determined as abnormal.

Since operation of the first processor core is abnormal, the image drawn on the screen layer L1 is unknown.

The third processor core 11C draws nothing on the screen layer L3.

The second processor core 11B transfers, through bit block transfer (BITBLT), an image stored in the internal memory 11B1 to draw an image representing the vehicle information on the screen layer L2. The vehicle information displayed on the screen layer L2 includes the warning lamp 31, the traveling speed 34, and a warning message 37. These pieces of vehicle information are drawn on an opaque background. The traveling speed 34 drawn through bit block transfer is a form of a digital instrument represented by a digital numerical value. The warning message 37 is a message representing the reason why the normal display mode is shifted to the emergency display mode and a proposal on an action a driver should take in the emergency display mode. The warning message 37 is, for example, a message indicating that "main processor core is out of order" and "please stop at a safe place immediately".

The display control part 15 combines the screen layers L1 to L3 to compose the composite layer L and displays the image illustrated in FIG. 6 on the display screen 20 of the display 2. At this time, the topmost screen layer L3 overwrites, and the screen layer L3 is displayed, regardless of the states of the screen layers L1 and L3.

The second processor core 11B causes the first processor core 11A to restart. The second processor core 11B monitors the first processor core 11A through the PVT monitor part 12. When the operation of the first processor core 11A becomes normal after the restart, the SOC 1 returns to the normal display mode.

Since the second processor core 11B performing the alternative display control is a secured processor core with high system robustness, capable of preventing falsification of a program, the instrument display function can be safely provided even when the first processor core 11A is in the false display state.

A first embodiment of the vehicle display device M has been described above.

The vehicle display device M of the present disclosure includes the display 2 displaying an image and the multicore SOC 1 causing the display 2 to display an image representing the vehicle information. The SOC 1 includes therein the first processor core 11A performing the normal display control under which the display 2 is caused to display the vehicle information in normal times, and the second processor core 11B performing the alternative display control under which the display 2 is caused to display the vehicle information in the false display state where the vehicle information is not correctly displayed on the display 2 under the normal display control.

This configuration enables the vehicle information to be alternatively displayed by the second processor core 11B even when the first processor core 11A operates abnormally, enhancing reliability from the viewpoint of functional safety.

Other Embodiments: Variations

The vehicle display device M of the present disclosure may be changed as follows.

The vehicle display device M may be applied to a head-up display displaying a virtual image on a windshield in front of the driver seat of the vehicle.

The SOC 1 may cause the display 2 to display entertainment information in addition to the vehicle information. The entertainment information includes an operating state of a car audio (information on the music being played, etc.), an operating state of "CarPlay (registered trademark)" connected to a cellar phone and operating an application program operated on the cellar phone, and the like. It is preferable that the entertainment information be drawn by the first processor core 11A only on the screen layer L1 and be drawn neither on the screen layer L2 drawn by the second processor core 11B nor on the screen layer L3 drawn by the third processor core 11C.

In display in normal times, one screen may be configured such that the third processor core 11C of the SOC 1 draws the warning lamp 31 on the screen layer L3, and the first processor core 11A draws all other pieces of the vehicle information except for the warning lamp 31 on the screen layer L1. In this configuration, a drawing load in normal times cam be shared by two processor cores.

A configuration in which the "other functions" of the SOC 1 except for the instrument display function are mounted on another IC chip is also possible. In other words, a configuration in which the instrument display function of the SOC 1 is mounted on the system in a package (SiP), and other functions are mounted on another IC chip is also possible. Examples of other functions include a function in cooperation with "CarPlay (registered trademark)", a function to control a car air-conditioner, a function to control car audio, and a function to communicate under a wireless communication standard such as "Wi-Fi (registered trademark)" or "Bluetooth (registered trademark)". That is, required is a configuration in which the instrument display function, which is the main function of the vehicle display device M, is integrated on one chip.

A configuration in which an external memory is connected to the SOC 1 for the purpose of expanding the capacity of the ROM 16 and the RAM 17 included in the SOC 1 is also possible.

The false display state may be determined when an error in an image of the screen layer L1 is detected by an error detection code such as a CRC code. In this case, since the image drawn on the screen layer L1 is incorrect, correct vehicle information is not displayed on the display 2. In this case, it is assumed that the cause is abnormality occurring in the operation of the first processor core 11A or the 3D drawing part 19, which cause an image to be drawn on the screen layer L1. The detection of an error in an image by the error detection code may detect an error throughout the screen layer L1 or may detect an error in an image representing an individual piece of the vehicle information or in a predetermined area. The detection of an error in an image by the error detection code may be executed by the display control part 15 or may be configured by another functional block.

The false display state may be determined when data on the composite layer L stored in the RAM 17 is compared with data on the video signal output from the display control part 15, and the composite layer L is not correctly converted to the video signal. In this case, correct vehicle information is not displayed on the display 2 because abnormality occurs in the operation of the display control part 15. Whether the composite layer L is correctly converted to the video signal may be detected by the error detection by the error detection code such as a CRC code. The error detection of the video signal is preferably configured by a functional block separated from the display control part 15.

REFERENCE SIGNS LIST

M . . . Vehicle display device
1 . . . SOC (multicore SOC)
11A . . . First processor core
11B . . . Second processor core
11B1 . . . Internal memory
11C . . . Third processor core
12 . . . PVT monitor part
13 . . . Communication part
14 . . . Video input part
15 . . . Display control part
16 . . . ROM
17 . . . RAM
18 . . . 2D drawing part
19 . . . 3D drawing part
2 . . . Display
20 . . . Display screen
31 . . . Warning lamp
32 . . . Trademark (opening performance image)
33 . . . Decoration (opening performance image)
34 . . . Traveling speed
35 . . . Engine speed
36 . . . Vehicle automatic control state
37 . . . Warning message
C . . . Vehicle-mounted camera
E . . . Vehicle-mounted ECU
N . . . In-vehicle network
L . . . Composite layer
L1 . . . Screen layer 1 (first layer)
L2 . . . Screen layer 2 (second layer)
L3 . . . Screen layer 3 (third layer)

The invention claimed is:

1. A vehicle display device comprising:
a display displaying an image; and
a multicore SOC causing the display to display an image representing vehicle information, wherein
the SOC includes therein a first processor core performing normal display control under which the display is caused to display the vehicle information in normal times, and a second processor core performing alternative display control in place of the first processor core under which the display is caused to display the vehicle information in a false display state where the vehicle information is not correctly displayed on the display under the normal display control.

2. The vehicle display device according to claim 1, wherein
the SOC causes the display to display a screen obtained by combining a plurality of layers,
the first processor core draws a first image representing the vehicle information on a first layer under the normal display control, and
the second processor core draws a second image representing the vehicle information on a second layer above the first layer under the alternative display control.

3. The vehicle display device according to claim 2, wherein
the first image includes a traveling speed, a warning lamp, and a vehicle automatic control state, and
the second image does not include the vehicle automatic control state and includes the traveling speed and the warning lamp.

4. The vehicle display device according to claim 1, wherein the SOC causes the first processor core to restart when determining the false display state.

5. The vehicle display device according to claim 2, wherein
the SOC includes a third processor core drawing a third image representing the vehicle information on a third layer positioned between the first layer and the second layer,
the second processor core starts up prior to the first processor core and the third processor core at startup of the SOC, and the third processor core starts up prior to the first processor core after the second processor core starts up at the startup of the SOC and draws the third image on the third layer until the first processor core starts the normal display control.

6. The vehicle display device according to claim 5, wherein the first image does not include an opening performance image, the second image does not include the opening performance image, and the third image does not include a traveling speed, does not include a vehicle automatic control state, and includes a warning lamp and the opening performance image.

7. The vehicle display device according to claim 5, wherein the first processor core draws the first image on the first layer through 3D drawing, the second processor core draws the second image on the second layer through bit block transfer, and the third processor core draws the third image on the third layer through 2D drawing.

8. The vehicle display device according to claim 1, wherein the SOC determines the false display state when abnormality in an operation clock of the first processor core is detected.

9. The vehicle display device according to claim 2, wherein the SOC determines the false display state when an error in data drawn on the first layer is detected.

10. The vehicle display device according to claim 1, wherein the SOC determines the false display state when an error in video signal data output to the display is detected.

* * * * *